April 23, 1940.                A. N. IKNAYAN                2,198,008
                        TEAR RESISTING RUBBER SHEETING
                               Filed Oct. 8, 1937

INVENTOR.
ALFRED N. IKNAYAN
BY
ATTORNEYS.

Patented Apr. 23, 1940

2,198,008

UNITED STATES PATENT OFFICE 2,198,008

TEAR RESISTING RUBBER SHEETING

Alfred N. Iknayan, Indianapolis, Ind., assignor, by mesne assignments, to United States Rubber Company, New York, N. Y., a corporation of New Jersey Application October 8, 1937, Serial No. 167,938

12 Claims. (Cl. 152—349)

This invention relates to tear resisting rubber articles, and in particular it relates to inner tubes having walls of rubber characterized by the feature of limiting the length of tears that might occur in the inner tube wall.

In general, the invention comprises an arrangement of separations extending partly through the wall of a rubber article, whereby tears which reach the separations are hindered from proceeding further in view of the difficulty of originating tears at the marginal wall of the separation.

When a tear or cut is initiated in a sheet of vulcanized rubber there is a tendency for the tear to increase rapidly with but very little strain in the rubber. It is considerably more difficult to start a tear at the edge of a sheet of vulcanized rubber than it is to increase the length of the tear after it is started. By utilizing this characteristic, I break up the continuity of the sheet of rubber through the incorporation therein of separations which, in effect, function as marginal edges and as such resist continuation of a tear.

In the mounting inner tubes and tire casings in assembly with a tire rim, particularly a rim of the drop center type, it frequently occurs that the inner tube is partially inflated before the tire is in full engagement with the bead seats of the rim. As a result of this condition, the tube becomes stretched excessively at localized portions, which stretched condition is not entirely relieved upon completion of the mounting of the assembly. Thereafter, when the tube is in operation failure is likely to occur in such excessively stretched zones. Complete failure of the tube may be originated by the pinching between the tire bead and the rim, by blow-outs, or by chafing conditions resulting from irregularities in the tire fabric.

In such inner tube failures a small tear or puncture occurs in the wall of the tube, and due to the force of the compressed air passing out of the tube and the tendency of the tube to tear easily after the tear originates, the resultant condition of the tube is such that the tear is too long to permit of satisfactory repair.

It is, therefore, among the objects of the invention to provide a sheet of rubber having characteristics which will function to minimize the tearing of the sheet, and to provide an inner tube capable of being satisfactorily repaired in the usual manner after failure.

These and other objects and advantages will appear more fully in the following detailed description of a preferred embodiment of the invention and with reference to the drawing in which.

Figure 1:
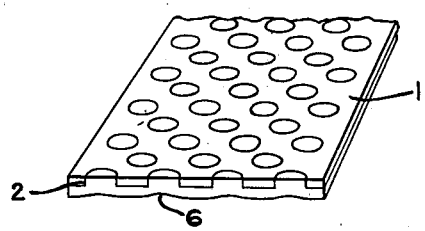
Fig. 1 is a perspective view of a sheet of rubber embodying the features of the invention.

Referring to the drawing, and in particular to Fig. 1, I show an embodiment of the invention in the form of a sheet of rubber 1 having a plurality of separations 2 in the form of circular paths, the axes of which extend substantially in a transverse manner relative to the plane of the sheet of rubber 1. The separations 2 forming the circular paths extend in depth to about one half of the thickness of the sheet of rubber 1. Effective results may be obtained by having the separations extend to a depth of at least one fourth of the thickness of the sheet, and not in excess of three fourths of the sheet thickness. The number and arrangement of the circular paths are such that a tear originating in any part of the strip and running in substantially a straight line should engage with one of the separations, resulting in greater resistance of the sheet of rubber against continuation of the tear. I have found that, by staggering the various rows of circular paths, a tear when initiated will communicate with one of the separations before the tear becomes comparatively long.

Figure 2:
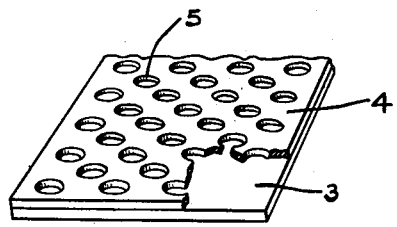
Fig. 2 is a perspective view, partly broken away, of the sheet in the process of manufacture.

In order that the fabrication, construction and function of the tear resisting material may be understood, reference may be made to Fig. 2 which illustrates a strip of the material in process of manufacture.

The strip 1 comprises a base layer 3 and a perforated layer 4. Both layers are of unvulcanized rubber, and may be of the same material composition, although effective results may be obtained by forming the perforated layer 4 of a rubber stock having tougher characteristics. This will increase the tear resisting quality of the sheet.

The perforated layer 4 is provided with a plurality of holes or perforations 5 extending through the layer of rubber. These perforations 5 are formed in the layer 4 prior to the application of the layer 4 to the base layer 3. Any suitable means, such as a punching operation, may be employed to make the perforations in the layer 4. The perforated layer 4 is placed in laminated relation with the base layer 3 while the layers are in their unvulcanized state. Under this condition, the layer 4 will adhere readily to the layer 3. If desired, the layers may be rolled together to insure proper adhesion.

After the layers 3 and 4 are properly adhered together, the laminated sheet thus formed is subjected to lubrication. A practical means of accomplishing this result is to subject the laminated sheet to a dusting operation with a medium such as powdered soapstone or mica. In the dusting operation the walls of the perforations 5 are well coated with the dusting medium.

In the next operation the strip 1 formed of the laminated layers 3 and 4 is vulcanized under heat and pressure. Preferably, the perforated layer 4 is placed adjacent the mold surface and pressure exerted against the exposed surface of the base layer 3. While this is the preferred method of placing the strip in the vulcanizing mold, it is obvious that various combinations of directing pressure and positioning the strip within the mold will operate to accomplish results which are substantially satisfactory.

Due to the application of the lubricating material, such as soapstone, the rubber of the base layer 3 will not merge with the walls of the perforations 5. However, an adherence or slight vulcanization between the different rubber layers may take place at the walls of the perforations. Upon vulcanization, the principal adjoining surfaces of the layers 3 and 4 merge together to form a unitary sheet of rubber. As shown in Fig. 1, a sheet of rubber is formed having a plurality of circular paths defining lines of demarcation between the different layers of rubber composition. When the rubber sheet is under extension any union between the rubber compositions at the walls of the perforations becomes broken, with the result that the circular paths define separations. Any union that may exist between the rubber compositions at the circular paths is broken with much less strain in the rubber than that required to produce a tear in rubber.

When the under side or exposed surface of the base layer 3 is subjected to fluid pressure, as distinguished from confinement in a mold, a plurality of indentations 6 are formed in complementary relation with the perforations. This is due to the flowing of rubber stock from the base layer 3 into the perforations 5 in the layer 4.

Figure 3:
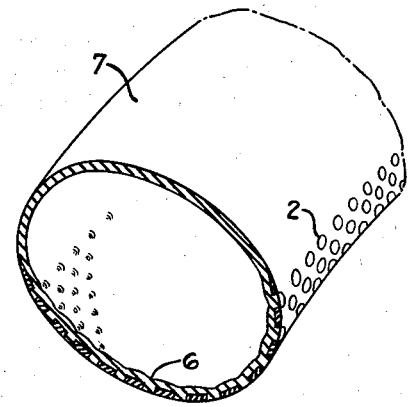
Fig. 3 is a perspective view, in section, of an inner tube showing features of the invention embodied therein; and, Fig. 4 is a perspective view, in section, of an inner tube, illustrating a modification of the inner tube shown in Fig. 3.

In Fig. 3 a practical embodiment of the tear resisting rubber is shown in the form of an inner tube 7. In this embodiment the tear resisting feature of the rubber is applied to the rim side of the inner tube, and includes that region extending over one half of the tube when measured transversely.

Figure 4:
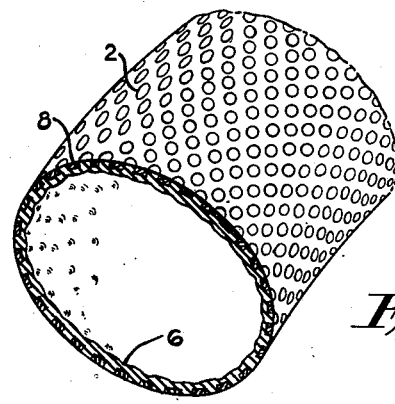

The tear resisting layer may be applied to the tread side only of the inner tube or it may be applied to the entire surface of the inner tube, such as shown by the inner tube 8 in Fig. 4.

In manufacturing inner tubes having a tear resisting layer of rubber, the embodiment may be manufactured by extruding the inner tube in the usual manner and thereafter applying a perforated layer to the outer surface of the tube. After this operation, the conventional practice of manufacturing inner tubes may be followed; that is, the tubes are spliced, dusted with soapstone, and vulcanized in conventional inner tube molds.

The laminated layers 3 and 4 as shown in Fig. 2 are representative of the tear resisting formation of the inner tubes. As thus applicable to finished inner tubes, I find the preferred thickness of the base layer 3 to be in the order of .055 inch, and the preferred thickness of the perforated layer 4 to be .040 inch. After vulcanization, and due to the flow of rubber from the base layer 3 into the perforations, the approximate thickness of the laminated sheet is in the order of .075 inch.

Good results in restricting the tearing of inner tubes may be obtained by providing at least eight perforations per square inch. It is desirable, however, to increase the number of perforations to about eighteen perforations per square inch. This may be accomplished by providing holes of a diameter of three sixteenths of an inch spaced one fourth of an inch on centers. The holes or perforations should be arranged so that it will be difficult to run a substantially straight line on the perforated sheet without coming into contact with at least one of the perforations in a relatively short distance.

It is preferable that the separations in the finished sheet describe a circular path, or at least a closed curved path. By staggering the arrangement of such separations, and placing them relatively close together, an initial tear will lengthen only a short distance before it reaches a separation. The tear then tends to proceed along the path of the separation. Because the separation is short and describes a closed path, the tear is restricted in its progress to the area defined by the closed path. In order to proceed farther, it would be necessary to start a new tear in the outer perforated layer. A curved path for the separation is less conducive to tearing than an angular path which has a discontinuous break in its length.

The relatively short length of a tear which occurs in this material permits the application of a relatively small patch to repair it. The outer surface of the material is smooth enough to accommodate a vulcanized patch or a patch secured by self-curing cement, with effective results.

My invention contemplates within its scope the principle of providing a vulcanized rubber material having a plurality of separations of readily separable unions forming marginal walls which operate to minimize tearing of the rubber sheet.

While I have shown and described certain present preferred embodiments of my invention, it is to be understood that it may be otherwise embodied within the spirit thereof and the scope of the appended claims.

Having thus described my invention, what I claim and desire to protect by Letters Patent is:

1. A tear resisting article comprising a wall formed of laminations of different rubber compositions united throughout their faces, said wall having a plurality of crevices extending from an outer surface to said united faces, said crevices defining closed paths, each of said paths being separate from the others.

2. An inner tube having a wall comprising inner and outer laminae of rubber composition, said outer lamina having perforations extending therethrough, said inner lamina being vulcanized to the inner face of the outer lamina and having portions extending into said perforations to define walls opposing the lateral walls of said perforations.

3. An inner tube having a wall comprising inner and outer laminae of rubber composition, said outer lamina having perforations extending therethrough, said inner lamina being substantially continuously secured to the inner face of the outer lamina and having portions extending into said perforations to define walls opposing the lateral walls of said perforations.

4. A tear resisting article comprising a wall formed of laminations of vulcanized rubber united throughout their faces, said wall having a plurality of crevices extending from one outer surface to said united faces, said crevices defining closed paths, each of said paths being separate from the others.

5. A tear resisting sheet comprising a wall formed of laminations of vulcanized rubber united throughout their faces, said wall having a plurality of crevices extending from one outer surface to said united faces, said crevices defining closed curved paths, each of said paths being separate from the others.

6. A tear resisting sheet comprising a wall formed of laminations of rubber vulcanized together substantially throughout their faces, said wall having a plurality of crevices extending from one outer surface to said united faces, said crevices defining closed curved paths, each of said paths being separate from the others.

7. An inner tube comprising a wall formed of laminations of vulcanized rubber united substantially throughout their faces, said wall having a plurality of crevices extending from one outer surface to said united faces, said crevices defining closed paths, each of said paths being separate from the others.

8. An inner tube having a wall comprising inner and outer laminae of different rubber compositions, said outer lamina having perforations extending therethrough, said inner lamina being substantially continuously secured to the inner face of the outer lamina and having portions extending into said perforations to define walls opposing the lateral walls of said perforations.

9. A tear resisting material comprising laminae of rubber composition, one of said laminae having perforations extending therethrough, the other lamina being substantially continuously secured to the face of the first named lamina and having portions extending into said perforations to define walls opposing the lateral walls of said perforations.

10. A tear resisting material comprising laminae of rubber composition, one of said laminae having curved perforations extending therethrough, the other lamina being substantially continuously secured to the face of the first named lamina and having portions extending into said perforations to define walls opposing the lateral walls of said perforations.

11. Rubber sheet material comprising laminae of different rubber compositions substantially continuously secured together, one of said laminae having perforations extending therethrough, the other lamina having portions extending into said perforations to define walls opposing the lateral walls of said perforations.

12. An inner tube having a wall comprising laminae of rubber composition substantially continuously secured together, one of said laminae having perforations extending therethrough, the other lamina having portions extending into said perforations to define walls opposing the lateral walls of said perforations.

ALFRED N. IKNAYAN.